United States Patent
Beran et al.

(10) Patent No.: US 8,207,277 B2
(45) Date of Patent: Jun. 26, 2012

(54) MODIFYING TUBULAR LDPE WITH FREE RADICAL INITIATOR

(75) Inventors: Debra L. Beran, Cincinnati, OH (US); Mark P. Mack, West Chester, OH (US); Anil W. Saraf, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 522 days.

(21) Appl. No.: 12/284,486

(22) Filed: Sep. 23, 2008

(65) Prior Publication Data
US 2010/0076160 A1    Mar. 25, 2010

(51) Int. Cl.
*C08F 8/06*    (2006.01)
*C08F 6/26*    (2006.01)

(52) U.S. Cl. .................... 525/333.8; 525/387; 526/348; 526/352

(58) Field of Classification Search ............ 526/348, 526/352; 525/333.8, 387
See application file for complete search history.

(56) References Cited

U.S. PATENT DOCUMENTS

| | | | | |
|---|---|---|---|---|
| 3,691,145 A | * | 9/1972 | Gierth et al. | 526/64 |
| 5,583,181 A | * | 12/1996 | Audureau et al. | 525/285 |
| 2002/0169238 A1 | * | 11/2002 | Caronia et al. | 524/100 |
| 2004/0077803 A1 | * | 4/2004 | Marechal | 526/64 |
| 2007/0203278 A1 | * | 8/2007 | Song et al. | 524/384 |
| 2011/0021713 A1 | * | 1/2011 | Demirors et al. | 525/324 |

FOREIGN PATENT DOCUMENTS
EP    1231238 A1 *    8/2002

OTHER PUBLICATIONS

M. Yamaguchi et al., "Rheological properties of low-density polyethylenes produced by tubular vessel processes" in Polymer, (2001), vol. 42, pp. 8663-8670.
C. Enos et al., Waters International GPC Symposium Proceedings, (2003), Baltimore, MD, USA.
C. Schuster, ExxonMobil High-Pressure Process Technology for LDPE, ExxonMobil Chemical Company, Baytown, TX, USA, 2006.

* cited by examiner

*Primary Examiner* — Roberto Rabago

(57) ABSTRACT

A method of modifying a tubular low density polyethylene (LDPE) is disclosed. In the method ethylene is polymerized with a free radical initiator in a high pressure reactor to form an LDPE. The LDPE is then reacted with a free radical initiator to produce a modified polyethylene. The modified polymer has an increased long chain branching index as indicated by the increase in the gel permeation chromatography branching index.

8 Claims, 1 Drawing Sheet

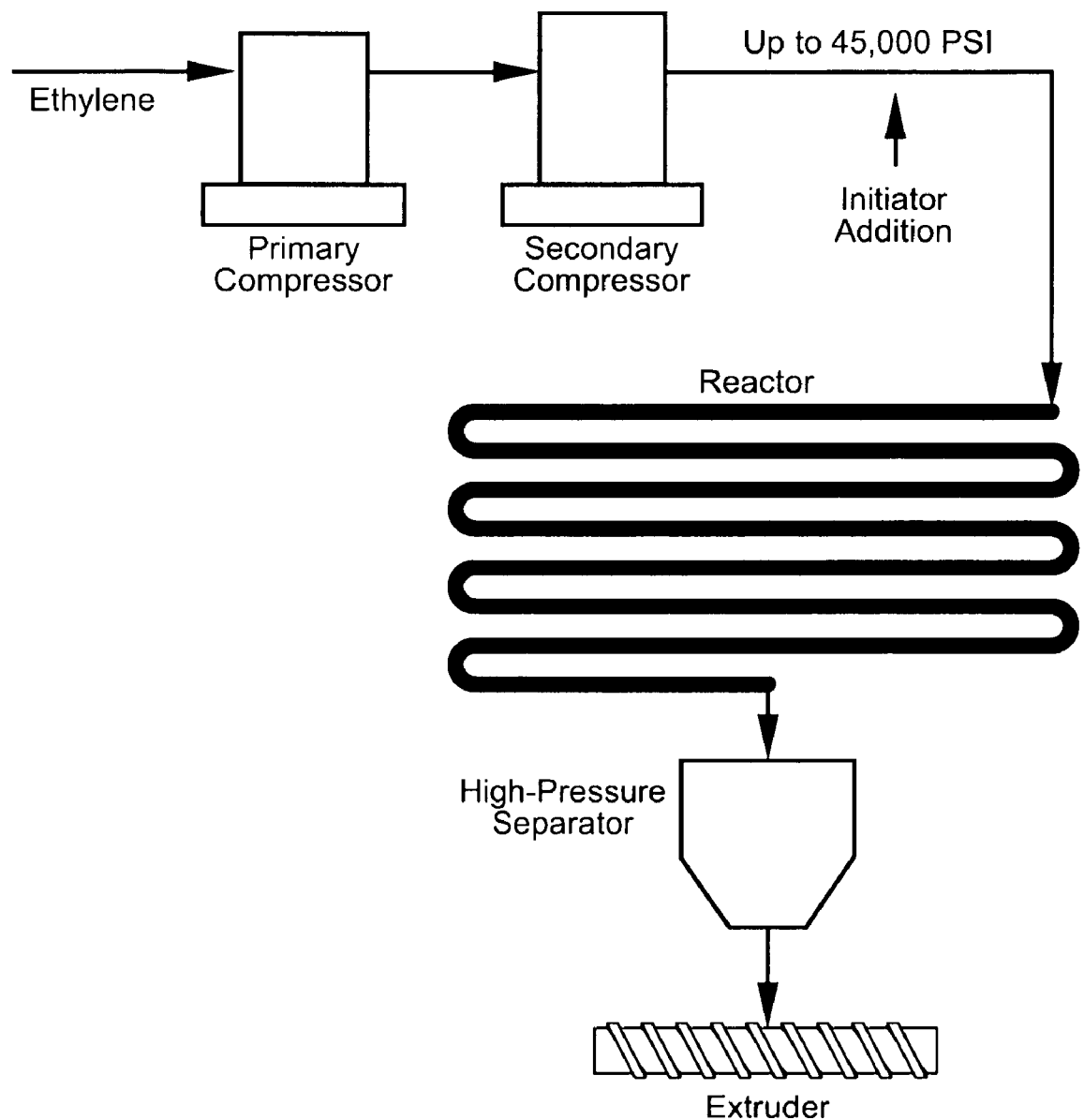

MODIFYING TUBULAR LDPE WITH FREE RADICAL INITIATOR

FIELD OF THE INVENTION

The invention relates to the modification of low density polyethylene (LDPE) made by a high pressure tubular reactor process. More particularly, the invention relates to modifying the tubular LDPE with free radical initiator to increase its long chain branching.

BACKGROUND OF THE INVENTION

Free radical polymerization of ethylene, with or without the presence of comonomers, produces low density polyethylene (LDPE). There are two basic processes for the manufacture of LDPE: autoclave and tubular. The LDPE made by the autoclave reactor process ("autoclave LDPE") has a high concentration of long chain branches that makes it easy to process. However, the autoclave reactor process has a low monomer conversion rate, usually about 20%. The tubular reactor process has a significantly higher monomer conversion rate than the autoclave reactor process. It has a monomer conversion rate up to 40%. The tubular reactor process requires a lower capital cost per unit of production than the autoclave process.

The LDPE made by the tubular reactor process ("tubular LDPE") has a lower concentration of long chain branches than the autoclave LDPE. The autoclave LDPE shows smaller g'-parameter, the ratio of intrinsic viscosity to that of linear polyethylene. Further, the autoclave LDPE exhibits larger upturn behavior than the tubular LDPE. In the stress relaxation measurement, the autoclave LDPE shows a larger damping function, while the tubular LDPE shows values similar to those predicted by the Doi-Edwards theory. Furthermore, there is a significant difference in the effect of the shear history on the melt strength. The melt strength of the autoclave LDPE decreases more rapidly with the shear history than that of the tubular LDPE. All of these differences between the two types of LDPEs are due to the difference in the branch structure. The complex, multi-branched structure of the autoclave LDPE gives much more prominent elastic features. See *Rheological Properties of Low-Density Polyethylenes produced by Tubular and Vessel Processes*, Yamaguchi Masayuki, and Takahashi Masaoki, Polymer 2001, Vol. 42, No. 21, pp. 8663-8670.

Although the tubular LDPE resins are good for general purpose films and cables, they are not suitable for some applications in which the autoclave LDPE resins are used. For instance, the tubular LDPE resins are not suitable for extrusion coatings because they give poor drawdown and high necking. Methods for modifying tubular LDPE are thus needed. Ideally, the modification would increase the long chain branching of the tubular LDPE to a similar level to the autoclave LDPE.

SUMMARY OF THE INVENTION

The invention relates to a method for modifying a low density polyethylene made by the tubular reactor process ("the tubular LDPE"). The method comprises reacting the tubular LDPE with a free radical initiator to form a modified LDPE. The modified LDPE has increased long chain branching as measured by the gel permeation chromatography branching index, hereinafter gpcBR. Preferably, the modified LDPE has a similar level of the long chain branching to that of the autoclave LDPE.

The invention also includes a process for producing a tubular LDPE. The process comprises polymerizing ethylene with air or a free radical initiator in a high pressure tubular reactor to form an LDPE, degassing the LDPE in a high pressure separator, and extruding the LDPE to pellets. In the process, a free radical initiator is mixed with the LDPE after it has been discharged from the tubular reactor but before processing in the extruder. Alternatively, the free radical initiator can added to the LDPE in the extruder during the extrusion.

BRIEF DESCRIPTION OF THE DRAWING

FIG. 1 is an illustrative process for tubular LDPE production.

DETAILED DESCRIPTION OF THE INVENTION

Suitable tubular LDPE for use in this invention includes ethylene homopolymers and copolymers made by the free radical polymerization in a pressure tubular process. Suitable tubular LDPE copolymers include ethylene-vinyl acetate copolymers, ethylene-vinyl alcohol copolymers, ethylene-acrylate copolymers, ethylene-methacrylate copolymers, ethylene-α-olefin copolymers, the like, and mixtures thereof. Suitable α-olefin comonomers for making the tubular LDPE copolymers include $C_3$-$C_{10}$ α-olefins, such as propylene, 1-butene, 1-hexene, 1-octene, the like, and mixtures thereof.

Preferably, the tubular LDPE has a density within the range of 0.915 g/cm$^3$ to 0.935 g/cm$^3$. More preferably, the tubular LDPE has a density within the range of 0.918 g/cm$^3$ to 0.932 g/cm$^3$. The density can be measured according to ASTM D2839-05.

Preferably, the tubular LDPE has a melt index $MI_2$ within the range of 0.1 g/10 minutes to 100 g/10 minutes. More preferably, the tubular LDPE has a melt index $MI_2$ within the range of 0.5 g/10 minutes to 50 g/10 minutes. Most preferably, the tubular LDPE has a melt index $MI_2$ within the range of 5 g/10 minutes to 20 g/10 minutes. The melt index $MI_2$ can be measured by ASTM D1238.

Preferably, the tubular LDPE has a molecular weight distribution (Mw/Mn) within the range of 3 to 25. More preferably, the tubular LDPE has a molecular weight distribution within the range of 3 to 15. Most preferably, the tubular LDPE has a molecular weight distribution within the range of 3 to 10. Molecular weight distribution can be measured by GPC.

Methods for making tubular LDPE are known. For instance, U.S. Pat. No. 3,691,145, the teachings of which are incorporated herein by reference, teaches producing LDPE in a tubular reactor process. For one embodiment, a mixture of ethylene and air is injected into a high pressure tubular reactor. The tubular reactor preferably has several zones where free ethylene and air are added. The addition of free ethylene and air cools the reactants and agitates the reaction mixture so that the molecular weight distribution of the LDPE can be varied. Optionally, a free radical initiator is added to the tubular reactor to speed up the polymerization. Suitable free radical initiator for the polymerization includes peroxides, hydroperoxides, peresters, and azo compounds, the like, and mixtures thereof. The pressure of the tubular reactor is preferably within the range of 1,500 bars (about 21,000 psi) to 3,500 bars (about 50,000 psi) and the polymerization temperature is preferably within the range of 150° C. to 350° C. The reaction mixtures with up to 40% monomer conversion is usually degassed in a high pressure separator and the molten polymer is then passed to an extruder and pelletized (see FIG. 1).

The tubular LDPE is modified with a free radical initiator after it has been formed and discharged from the tubular reactor. In one aspect, the modification is preferably performed by mixing the tubular LDPE with free radical initiator in the high pressure separator, and the mixture is then passed to the extrusion. In another aspect, the modification is preferably performed by adding the free radical initiator to the tubular LDPE in the extruder. The modification can also be performed outside the LDPE production line or outside the LDPE production facility by mixing the free radical initiator with the tubular LDPE pellets or powder and then extruding the mixture.

Suitable free radical initiators include those known in the polymer industry including peroxides, hydroperoxides, peresters, and azo compounds, the like, and mixtures thereof. Examples of suitable free radical initiators include dicumyl peroxide, di-t-butyl peroxide, t-butylperoxybenzoate, 2,5-dimethyl-2,5-di(t-butylperoxy)hexane, t-butyl peroxyneodecanoate, 2,5-dimethyl-2,5-di(t-butylperoxy)hexyne, t-amyl peroxypivalate, 1,3-bis(t-butylperoxyisopropyl)benzene, tert-amylperoxy 2-ethyl hexanoate, t-butylperoxy 2-ethyl hexanoate, t-butyl peroxy isobutyrate, t-butylperoxy isopropyl carbonate, t-butylperoxy 3,5,5-trimethylhexanoate, 2,5-dimethyl-2,5-di(benzolyperoxy)hexane, n-butyl 4,4-di(t-butylperoxy)valcratic, t-butylcumyl peroxide, di(2-t-butylperoxy isopropyl)benzene, t-butyl hydroperoxide, cumyl hydroperoxide and mixtures thereof. Examples of suitable azo compounds include 2,2'-azobisisopropionitrile, 2,2'-azobisisobutyronitrile (AIBN), dimethyl azoisobutyrate, 1,1'-azobis (cyclohexanecarbonitrile), 2,2'-azobis(2-methylpropane), the like, and mixtures thereof. Most preferably the free radical initiator is selected from the group consisting of dicumyl peroxide, di-t-butyl peroxide, cumyl hydroperoxide, 2,5-dimethyl-2,5-di-t-butylperoxy hexyne, the like, and mixture thereof.

Preferably, the free radical initiator is used in an amount within the range of about 50 to about 5,000 ppm of the tubular LDPE, more preferably from about 300 to about 4,500 ppm of the tubular LDPE, and most preferably from about 500 ppm to about 2,500 ppm of the tubular LDPE. The reaction of the tubular LDPE with the free radical initiator can be performed at a temperature above the melting point of the tubular LDPE. This is the so-called molten peroxidation. Molten peroxidation is preferably performed in an extruder or any other thermal process equipment. The reaction can also be performed at a temperature below the melting point of the tubular LDPE. This is the so-called solid-state peroxidation. Preferably, the reaction of the tubular LDPE with the free radical initiator is performed at a temperature within the range of about 100° C. to about 350° C. More preferably, the reaction of the tubular LDPE with the free radical initiator is performed at a temperature within the range of about 150° C. to about 250° C.

The modified tubular LDPE has an increased long chain branching. The long chain branching can be measured by a gel permeation chromatography branching index, gpcBR. The gpcBR is calculated from the bulk light scattering (LS) weight average molecular weight, bulk intrinsic viscosity, and their linear equivalents from conventional GPC calculations. The value of gpcBR is given by:

$$gpcBR = \left(\frac{M_{w,b}}{M_{w,L}}\right)^\alpha x \left(\frac{[\eta]_L}{[\eta]_b}\right) - 1$$

where $M_{w,b}$ is the bulk weight average molecular weight by light scattering, $M_{w,L}$ is the weight average molecular weight calculated from the concentration detector GPC curve assuming a linear polymer structure, $[\eta]_b$ is the bulk intrinsic viscosity by online viscosity detector, $[\eta]_L$ is the intrinsic viscosity calculated from the concentration detector GPC curve assuming a linear polymer structure using the Mark-Houwink constants, K and α, for linear polyethylene, and α is a Mark-Houwink constant for linear polyethylene. For more details about theoretical aspects of gpcBR index, see C. Enos, K. Rufener, J. Merrick-Mack, and W. Yau, *Waters International GPC Symposium Proceedings*, Jun. 6-12, 2003, Baltimore, Md.

Preferably, the gpcBR of the modified LDPE is increased by at least 5% compared with the tubular LDPE. More preferably, the gpcBR of the modified LDPE is increased by at least 10% compared with the tubular LDPE. Most preferably, the gpcBR of the modified LDPE is increased by at least 20% compared with the tubular LDPE.

The modified LDPE has many applications. It can be used in extruded films, including the blown films and cast films. The modified LDPE can also be used in molding, including blown molding and injection molding. More importantly, the modified LDPE can be used in extrusion coatings. As a result of the increased long chain branching, the modified LDPE is expected to meet the process requirement of the extrusion coatings.

The following examples merely illustrate the invention. Those skilled in the art will recognize many variations within the spirit of the invention and scope of the claims.

Comparative Example 1

Preparation of Tubular LDPE

A mixture of ethylene and air initiator is compressed to a pressure within the range of 30,000 psi to 40,000 psi. The compressed mixture enters a tubular reactor. The compressed mixture is heated to 175° C. and the polymerization begins. As the polymerization proceeds, the reaction temperature rises. Pressurized hot water (150° C. to 180° C.) is circulated through the jackets surrounding the reactor tubes to keep the reaction temperature between 230° C. to 285° C. The polymer is discharged from the tubular reactor and degassed; and the molten polymer enters a Killion extruder to form the tubular LDPE pellets. The extrusion temperature is within the range of 175° C. to 200° C. The tubular LDPE has a density: 0.924 gm/cc, melt index $MI_2$: 6.2 gm/10 min, weight average molecular weight Mw: 71,500 gm/mol, number average molecular weight Mn: 17,235 gm/mol, and gel permeation chromatography branching index gpcBR: 1.06.

The gpcBR is measured by Triple-Detector Gel Permeation Chromatography (3D-GPC) under the following conditions. All GPC analyses are performed on a Waters GPC2000CV equipped with a differential refractometer, triple capillary viscometer, and a dual-angle light scattering detector (from Precision Detectors). Two analytical columns (mixed bed LS, from Polymer Labs) and a guard column are used with 1,2,4-trichlorobenzene (TCB) at 145° C. at a nominal flow rate of 1.0 mL/min. Samples are prepared by dissolving 6-8 mg of material in TCB (3.7 mL) for 1 h at 175° C. with manual agitation at 30-minute intervals. The TCB solvent contains about 800 ppm of BHT. All calculations are performed using Waters Empower GPC software equipped with the light scattering option. Conventional calibration curves are generated using an in-house broad polyethylene standard and the cumulative matching % calibration procedure.

Examples 2-5

Preparation of Modified LDPE

Example 1 is repeated but a given amount of 2,5-dimethyl-2,5-di-(tertbutylperoxy)hexane is fed into the extruder and the peroxidized LDPE is then pelletized. Table 1 shows the effect of the peroxide concentration on the gpcBR value of the modified LDPE. The results indicate that the gpcBR of the modified LDPE increases with the increase of the amount peroxide used. When the peroxide is used in 100 ppm, the gpcBR is increased by about 4%. When the peroxide is used in 500 ppm, the gpcBR is increased by about 16%.

TABLE 1

The gpcBR values of the Tubular LDPE and the Modified LDPE

| Ex. No. | Peroxide concentration, ppm | gpcBR |
|---|---|---|
| C1 | 0 | 1.06 |
| 2 | 10 | 1.07 |
| 3 | 50 | 1.08 |
| 4 | 100 | 1.10 |
| 5 | 500 | 1.23 |

We claim:

1. A process comprising polymerizing ethylene in a high pressure tubular reactor to produce a LDPE, degassing the LDPE in a high pressure separator, and extruding the LDPE to form pellets, wherein a free radical initiator is mixed and reacted with the LDPE after it is discharged from the tubular reactor but before the extrusion, and wherein the free radical initiator is mixed with the LDPE in the high pressure separator, wherein the LDPE that has been mixed and reacted with free radical initiator has at least a 5% increase in gel permeation chromatography branching index (gpcBR) compared with the LDPE that has not been mixed and reacted with free radical initiator.

2. The process of claim 1, wherein the free radical initiator is used in an amount within the range of about 50 ppm to about 5000 ppm of the LDPE.

3. The process of claim 1, wherein the reaction of the LDPE with the free radical initiator is performed at a temperature within the range of about 100° C. to about 350° C.

4. The process of claim 3, wherein the reaction temperature is within the range of about 150° C. to about 250° C.

5. The process of claim 1, wherein the LDPE has at least a 10% increase in gpcBR.

6. The process of claim 1, wherein the LDPE has at least 15% increase in gpcBR.

7. The process of claim 1, wherein the free radical initiator is a peroxide selected from the group consisting of dicumyl peroxide, di-t-butyl peroxide, cumyl hydroperoxide, t-butyl hydroperoxide, 2,5-dimethyl-2,5-di-t-butylperoxy hexyne, and mixtures thereof.

8. The process of claim 1, wherein the free radical initiator is used in an amount within the range of about 500 to about 4000 ppm of the LDPE.

* * * * *